United States Patent [19]

Peterson

[11] Patent Number: 4,458,115
[45] Date of Patent: Jul. 3, 1984

[54] SAFETY APPARATUS FOR MOTOR VEHICLES

[76] Inventor: Philip C. Peterson, 665 Grandview La., Lake Forest, Ill. 60045

[21] Appl. No.: 369,258

[22] Filed: Apr. 16, 1982

[51] Int. Cl.³ ........................ H01H 9/06; A63H 5/08
[52] U.S. Cl. ................................. 200/61.85; 200/157; 440/87
[58] Field of Search ............... 200/61.85, 61.86, 61.88, 200/61.89, 61.91, 157; 440/1, 6, 84–87

[56] References Cited

U.S. PATENT DOCUMENTS

| | | | |
|---|---|---|---|
| 3,790,729 | 2/1974 | Bradshaw | 200/61.88 |
| 3,894,207 | 7/1975 | Jelley | 200/61.85 X |
| 3,989,002 | 11/1976 | Peterson | 440/87 X |
| 4,006,334 | 2/1977 | Robotham et al. | 200/61.85 X |
| 4,138,601 | 2/1979 | Nakamura et al. | 200/61.85 |
| 4,144,424 | 3/1979 | Takeda et al. | 200/61.88 |
| 4,270,032 | 5/1981 | Dobberpuhl | 200/157 X |
| 4,284,865 | 8/1981 | Nicholson | 200/61.85 X |

Primary Examiner—J. R. Scott
Attorney, Agent, or Firm—Mason, Kolehmainen, Rathburn & Wyss

[57] ABSTRACT

Safety apparatus for motor vehicles such as boats, snowmobiles, motorcycles, motorbikes and the like, having a handlebar control includes a hand grip mounted on the handlebar and a safety switch in the hand grip for shutting down the power unit of the vehicle in response to withdrawal of the operator's hand from the hand grip of release of hand pressure thereon.

35 Claims, 8 Drawing Figures

SAFETY APPARATUS FOR MOTOR VEHICLES

BACKGROUND OF THE INVENTION

1. Field of the Invention

The present invention relates to a new and improved safety apparatus for motor vehicles and more particularly, to a new and improved safety apparatus for motor vehicles such as power boats, snowmobiles, motorcycles, lift trucks, etc. having a handlebar control for controlling the speed and/or direction of the vehicle.

More particularly, the safety apparatus of the present invention is directed toward a semi-passive system for shutting down the power unit of the vehicle automatically should the operator's hand be withdrawn or hand pressure removed from the hand grip on the handlebar control as a result of an accident or other situation such as the operator becoming dislodged or knocked away from the control station of the vehicle.

2. Description of the Prior Art

Motor vehicles such as snowmobiles, powerboats, and bass-boats have been equipped with "kill-switches" for shutting down the motor of the vehicle. These so-called "kill switches" are of the type including a tether cord which must first be attached to the operator's hand or arm so that when the operator's hand is abruptly withdrawn from the throttle or control area, the "kill switch" is activated to shut down the engine. If an engine should continue running in an uncontrolled manner after the operator is dislodged from the vehicle, great damage can result. A serious limitation of "kill-switches" of this type is the fact that the operator is required to take a positive step of attaching the tether cord to his limb or body before getting under way. Moreover, such tethered attachment often becomes a nuisance or an encumbrance in operation and control of the vehicle. Because presently available "kill-switches" require positive action on the part of the operator, they are not used universally and even if installed, attachment of the tether is sometimes forgotten in the haste of the moment or when it is desired to get the vehicle rapidly under way.

OBJECTS OF THE INVENTION

Accordingly, it is an object of the present invention to provide a new and improved safety apparatus for motor vehicles and more particularly for motor vehicles of the type including handlebar control means.

It is another object of the present invention to provide a new and improved safety apparatus of the character described which is more of a passive type device than prior art "kill-switches" in that activation thereof is rapid, easy, more natural and automatic, thus less likely to be forgotten.

Another object of the present invention is to provide a new and improved safety apparatus of the character described which may be positively locked out when desired for engine starting or other circum- stances.

Another object of the present invention is to provide a new and improved control apparatus for motor driven vehicles including a handlebar and hand grip with an integrated safety switch therein adapted for shutting down the power unit of the vehicle in response to withdrawal of or release of hand pressure by the operator's hand on the grip.

Yet another object of the present invention is to provide a new and improved motor vehicle having a steering and/or propulsive control member with safety apparatus of the character described incorporated therein.

Another object of the present invention is to provide a new and improved power boat having a novel steering and propulsion control system with automatic safety apparatus for shutting down the engine of the boat in emergencies.

SUMMARY OF THE INVENTION

The foregoing and other objects and advantages of the present invention are accomplished in an illustrated embodiment herein comprising new and improved safety apparatus for motor vehicles having a handlebar control. The apparatus includes a hand grip mounted on the control with a safety switch integrally carried in the grip for shutting down the power unit of the vehicle in response to withdrawal of or release of hand pressure from an operator's hand on the hand grip. The safety apparatus is useful with motor vehicles of a variety of types such as boats, snowmobiles, motorcycles, lift trucks, and the like which have handlebar controls for controlling the steerage and/or direction of propulsion of the vehicle. Lock out means is provided for use when desired for engine starting or other circumstances when the safety system is not needed or would interfere with the intended mode of operation of the vehicle.

BRIEF DESCRIPTION OF THE DRAWINGS

For a better understanding of the present invention, reference should be had to the following detailed description taken in conjunction with the drawings, in which.

DESCRIPTION OF A PREFERRED EMBODIMENT

Referring now more particularly to the drawings, in FIGS. 1-5 is illustrated and new and improved safety apparatus for motor vehicles and the like which includes a hand grip assembly 10 secured on an outer end portion of a control sleeve 12 by means of a set screw 14. The control sleeve is mounted for selective rotation on an outer end portion of a handlebar or control element 16 of a motor vehicle such as a boat 20, shown schematically in FIG. 5, and in more detail in FIGS. 6, 7 and 8.

Manual rotation of the control sleeve 12 with the hand grip assembly 10 is utilized for controlling the power, speed and/or direction of propulsion from the engine or power unit of a vehicle, and as illustrated by the arrows "A" in FIGS. 3, 6, 7 and 8, the sleeve is positively and selectively controlled by an operator's hand to rotate in either direction. The rotative sleeve is retained on the handlebar 16 by an end cap 22 which is secured in place by a set screw 24.

In accordance with the present invention, the hand grip assembly 10 includes a generally rectangular shaped body 26 (FIGS. 1 and 4) preferably made of molded resinous plastic material and formed with an elongated hollow bore 26a extending longitudinally through a lower portion for receiving the control sleeve 12 which extends through the bore.

Figures 3, 4:
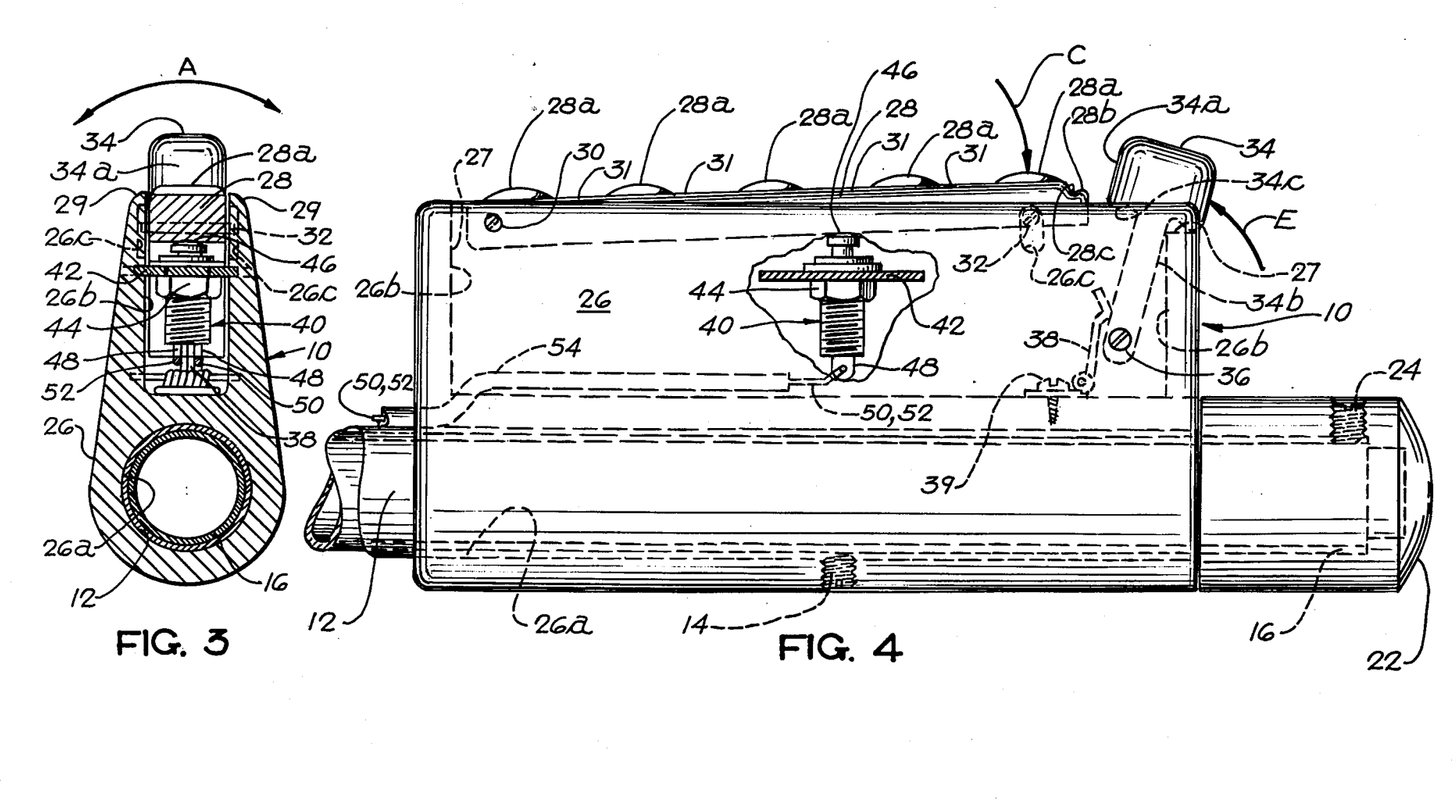
FIG. 3 is a transverse, cross-sectional view taken substantially along lines 3—3 of FIG. 1.
FIG. 4 is an elevational view similar to FIG. 1, but illustrating the safety apparatus in a different operative position after withdrawal of or release of hand pressure by an operator's hand on the hand grip.

The body 26 is formed with an enlarged, generally rectangular shaped recess 26b extending longitudinally of the handle, closed at opposite ends by end walls 27 and open at the upper end in order to receive an elongated, control bar 28. The control bar is pivotally mounted at one end of the recess on a pivot axle 30 extending transversely across the body of the hand grip between opposite side walls 29. An outer surface of the operator element is formed with a plurality of spaced apart, transversely extending finger ribs 28a which define recesses or valleys 31 therebetween for accommodating the fingers and providing for improved control of the hand grip. As illustrated in FIG. 3, the sleeve bore 26a is eccentrically positioned with respect to the body 26 so that relatively little hand pressure applied to the side walls 29 of the body is effective to exert enough torque for rotating the sleeve (arrow A) in either direction as desired to actuate control mechanisms such as throttles and/or shift mechanisms of a motor or engine.

Figures 1, 2:
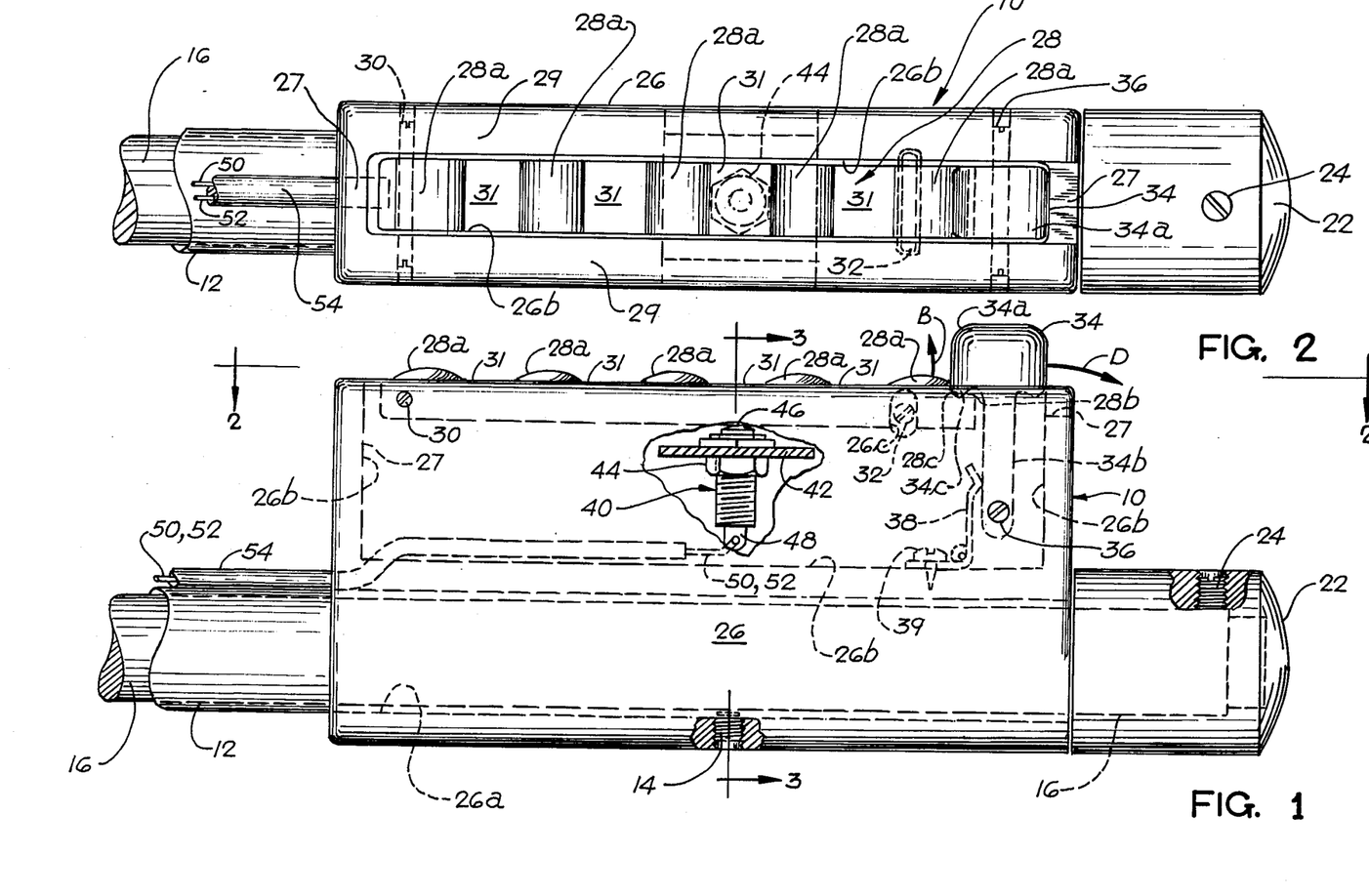
FIG. 1 is an elevational view of a handlebar control of a safety apparatus for use with motor vehicles and constructed in accordance with the features of the present invention.
FIG. 2 is an elevational view of the safety control apparatus of FIG. 1 looking in the direction of arrows 2—2 of FIG. 1.

The elongated control bar 28 is mounted to pivot about the pin 30 between a first control position shown in FIG. 1 wherein the bar is generally parallel of the control sleeve 12 (RUN position) and is pivotable in a counterclockwise direction as indicated by the arrow "B" toward a second control position as shown in FIG. 4 (SHUT-DOWN position) for engine "shut down" wherein the outer surface of the operator bar is elevated to diverge upwardly away toward the outer end from the adjacent upper surface of the hand grip body.

The control bar 28 is pivotal in a reverse or clockwise direction as indicated by the arrow "C" of FIG. 4 to return back toward the "RUN" position of FIG. 1 and this position is usually maintained during normal operation by the pressure of an operator's hand grasping the hand grip control. The extent of the pivotal movement of the control bar permitted is limited by means of a cross-pin 32 having outer end portions extending outwardly from opposite side faces of the bar and adapted to engage stop surfaces at upper and lower ends of elongated vertical slots 28c formed in the opposite side walls 29 of the large rectangular recess 26b.

When desired, the control bar 28 may be positively retained or mechanically locked in the "RUN" position of FIG. 1, and for this purpose, the apparatus includes a generally T-shaped, lockout element 34 having an enlarged upper head portion 34a extending upwardly above the upper surface of the body 26 (as viewed in FIGS. 1 and 4). The lockout element includes a downwardly depending leg 34b which is pivotally secured within the recess 26b on a cross-pin 36 extending between the opposite side walls 29 of the body.

As viewed in FIG. 1, the lockout element 34 is biased in a clockwise direction about the pin 36 (as indicated by the arrow "D") by a spring element 38 mounted in the bottom of the recess and secured in place by a cap screw 39. The spring includes an upstanding finger which engages the leg 34b to bias the lockout element towards an outward or "RELEASE" position as shown in FIG. 4 wherein the lockout element is positioned out of engagement with the adjacent outer end of the control bar 28. The lockout element can be pivoted back toward a "LOCKOUT" position shown in FIG. 1 and thus "reset" for mechanically holding and retaining the right hand end of the operator bar 28 in the "RUN" position. Resetting is accomplished by movement of the element 34 in the direction of the arrow "E" (FIG. 4).

The head 34a includes a detent in the form of a depending rib 34c on the underside and during resetting the rib is adapted to ride up and over a similarly shaped upstanding rib 28b formed on the upper surface at the right hand end of the control bar 28. Further counterclockwise movement (arrow E) of the element 34 permits the detent rib 34c to seat in a groove 28c formed on the upper surface of the bar 28 inwardly of the end rib 28b and in this position the control bar 28 is mechanically retained in the "RUN" position and the detent element is retained in the "LOCKOUT" position against the bias force of the spring 38.

In order to release the lockout element 34 from the "LOCKOUT" position as shown in FIG. 1, the righthand edge of an operator's right hand is moved against the enlarged head portion 34a to pivot the element outwardly away as indicated by the arrow "D" until the detent rib 34c moves out of the groove 28c and over the rib 28b of the control bar. After passing the rib 28b the detent element 34 is released and the control bar 28 is then free to pivot upwardly in a counterclockwise direction as indicated by the arrow "B" to the "SHUT-DOWN" position whenever the operator's hand pressure on the bar is relaxed or the hand is withdrawn from the hand grip. Once the lockout member 34 is moved to the "RELEASE" position of FIG. 4, the spring 38 maintains the detent member in this position until "resetting" occurs. Outward pivotal movement of the detent 34 is limited by engagement between the righthand outer end wall 27 of the body which serves as a stop against the depending leg 34b of the lockout element 34 as shown in FIG. 4.

In accordance with the present invention, the safety apparatus 10 includes a normally closed contact, push button/plunger type safety switch 40 mounted in the central portion of the recess 26b of the hand grip body 26. The switch is supported in a drilled aperture on a cross plate 42 which extends transversely across the recess between opposite walls 29 at an intermediate level below the underside of the control bar 28. The switch includes a threaded body portion depending downwardly through the aperture in the mounting plate 42 and the body is secured in a selected vertical position relative to the mounting plate with a lock nut 44.

The switch includes a rounded upper end portion or head formed on a vertical operating plunger 46 for activating an internal switch element in the switch body. The head of the plunger engages the underside of the control bar 28 and is internally spring biased upwardly of the switch body tending to pivot or bias the operator bar from the "RUN" position of FIG. 1 towards the "SHUTDOWN" position shown in FIG. 4. In the "RUN" position of FIG. 1 the switch contacts are forced open and in the "SHUTDOWN" position of FIG. 4 the switch contacts are normally closed. The internal biasing force on the operating plunger 46 of the switch is an effective biasing force to pivot the control bar 28 in a counterclockwise direction from the "RUN" position of FIG. 1 to the "SHUTDOWN" position of FIG. 4 unless the detent element 34 is the "LOCK-OUT" position and/or hand pressure on the control bar is sufficient to maintain the control bar in the "RUN" position.

Whenever the plunger 46 of the switch 40 is in a depressed or downward position because of hand pressure on the control bar 28 or because the lockout element 34 is in the "LOCKOUT" position, the switch contacts are open and provide an open circuit in the electrical system associated therewith. Whenever, hand pressure on the control bar is relaxed sufficiently and the detent element 34 is not in the "LOCKOUT" position the switch contacts are normally closed.

The switch 40 includes a pair of depending terminal lugs 48 on the lower end of the body and these lugs are connected to respective conductors 50 and 52 of an insulated cable 54. The cable extends into the recess 26b in the hand grip body 26 through an opening in the lefthand end wall 27 as shown in FIGS. 1 and 4.

Figure 5:
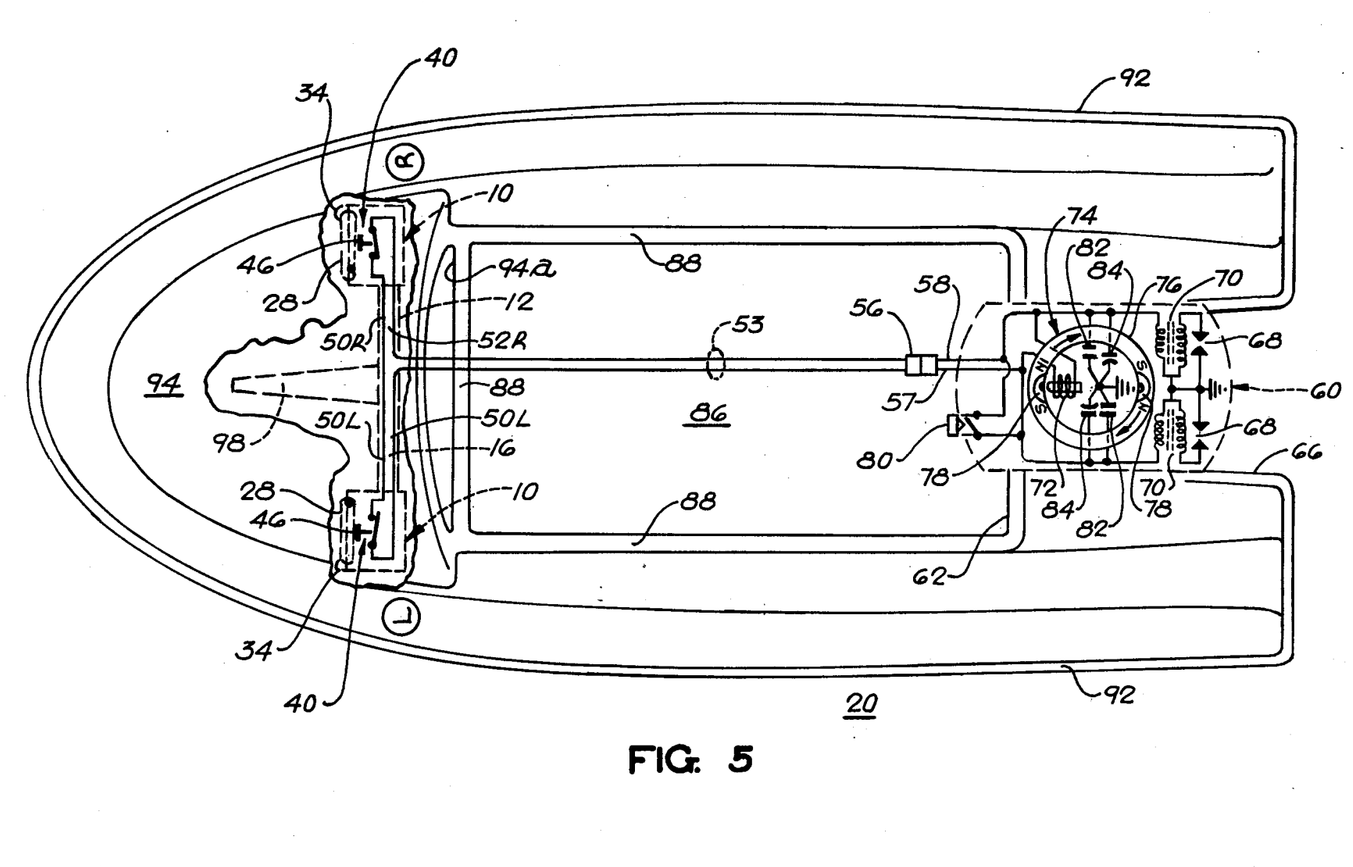
FIG. 5 is a schematic diagram illustrating the safety apparatus as installed on a boat powered by an outboard motor.

Referring now to the schematic diagram of FIG. 5, a pair of hand grip assemblies 10 may be provided and mounted on opposite end portions of the handlebar 16. These safety hand grips may be termed as left and right hand units as shown in the drawings and labelled "L" and "R".

As indicated in the schematic diagram of FIG. 5, the left and right hand safety switches 40 are electrically connected in series and conductors 50L and 50R from each switch are spliced together whereas, the conductors 52L and 52R are not interconnected and pass via a 2-conductor cable 53 through a detachable connector plug and socket assembly 56 to respective conductors 57 and 58 in the magneto circuit of an outboard motor 60.

Figures 6, 7:
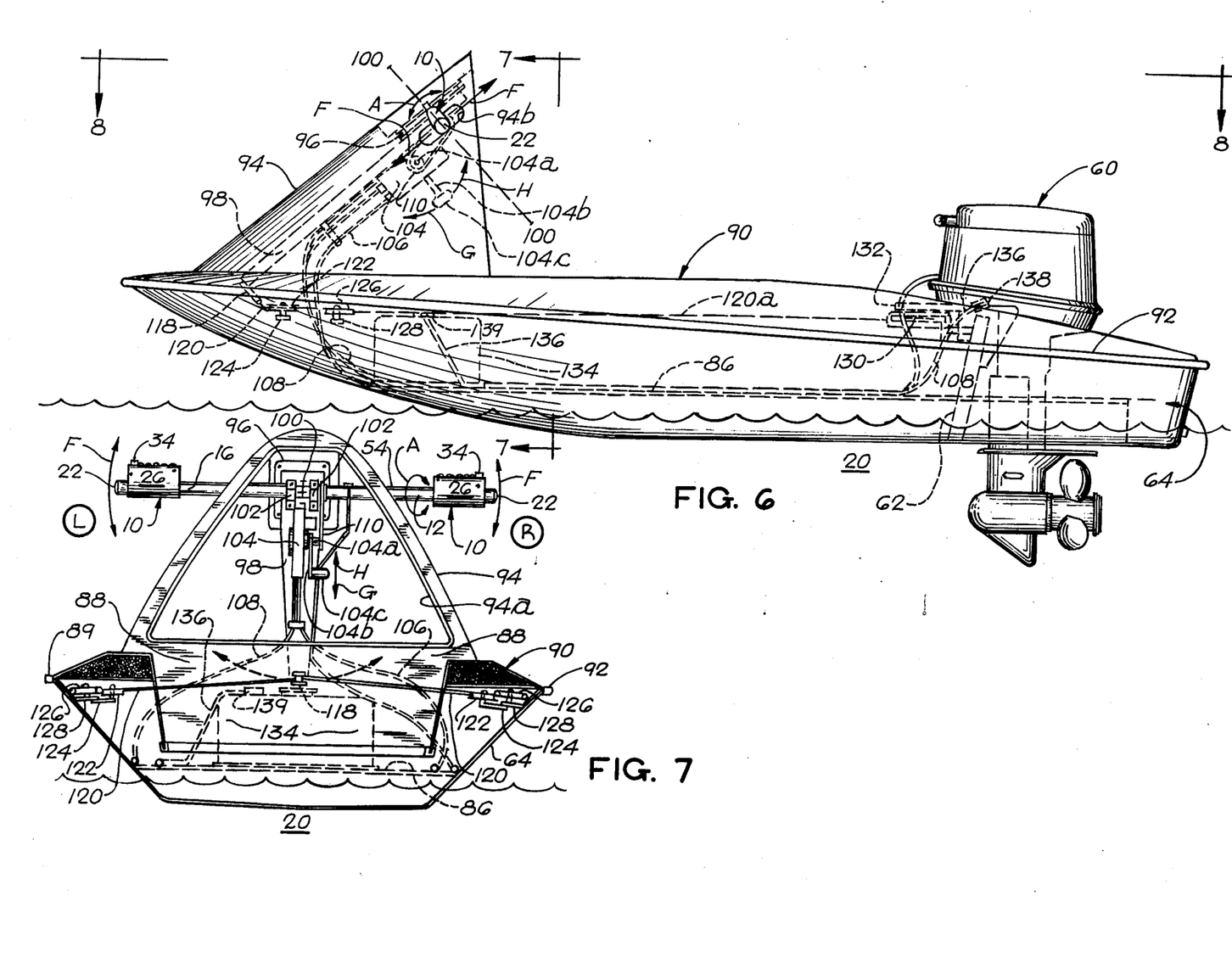
FIG. 6 is a side elevational view of a boat prowered by an outboard motor and having safety apparatus in accordance with the present invention installed thereon.
FIG. 7 is a cross-sectional view taken substantially along lines 7—7 of FIG. 6.
Figure 8:
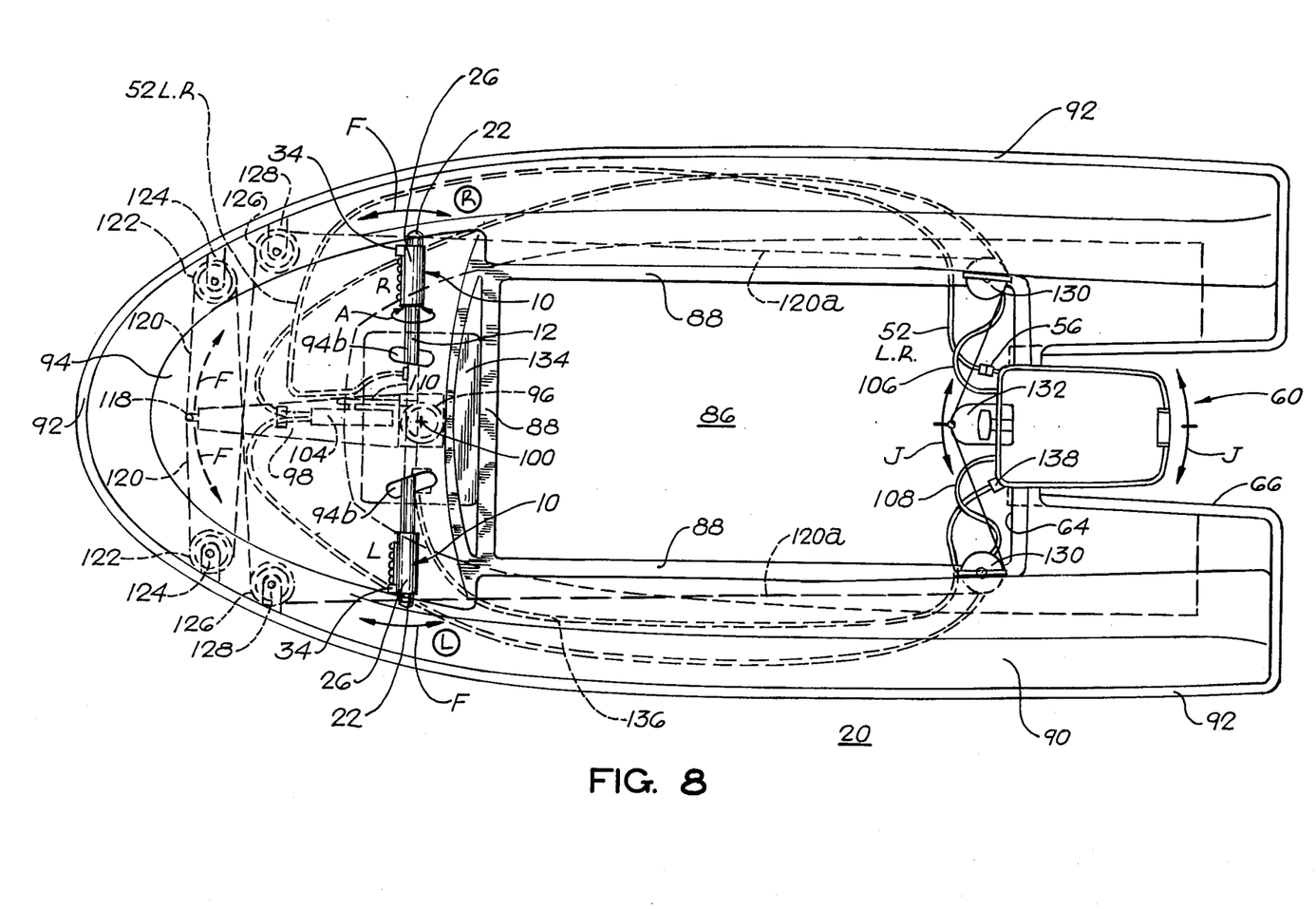
FIG. 8 is a top plan view looking downwardly in the direction of the arrows 8—8 of FIG. 6.

The motor is mounted for pivotal movement (arrows J) in a conventional manner on a transom 62 of the boat hull 64 in a recessed motor well 66 as best shown in FIGS. 5, 6 and 8. For the particular boat 20 as illustrated and described, the outboard motor 60 is preferably a two-cycle, commercially available type of relatively low horsepower (10–35 H.P.) employing two cylinders. Other types of power units can be utilized.

Typically, such motors include spark plugs 68 connected across the secondary winding of an ignition transformer 70. A primary side of each ignition or transformer coil is connected to one of the respective conductors 57 and 58 and these conductors, in turn are connected across the winding of an impulse induction coil 72 of a magneto 74.

The magneto includes a rotatable flywheel 76 having a pair of magnets 78, each of which is adapted to generate an electrical impulse in the coil 72 during each revolution of the flywheel. A set of breaker points 82 and condenser 84 is provided for each spark plug and a normally open type "push-to-stop" switch 80 is mounted on the motor housing.

The switch contacts of the switch 80 are connected to the respective conductors 57 and 58 so that the engine 60 will shut down when the push button of the stop switch is manually depressed. When this occurs, the coil 72 is shorted out and no spark impulses then reach the spark plugs 68. The leads 52L and 52R of the series connected, left and right hand safety switches 40 are connected in parallel with the push-to-stop switch 80 and when the contacts of both of these safety switches are in the normally closed position, the outboard engine 60 is shut down electrically by shorting out the coil 72 via the conductors 50, 52L and 52R, and the closed safety switches.

In accordance with the present invention, if a boat operator releases hand pressure or his hand is withdrawn from one of the safety hand grip assemblies 10 (either left or right), but not both, one of the safety switches 40 remains open and the other moves to a "normally closed contact" condition. Because the switches are connected in series, however, the coil 72 will not be shorted out and the engine will continue to run with only one safety switch closed. This arrangement permits an operator to withdraw one hand but, not both, from the handlebar without causing the engine to shut down.

If both hands are withdrawn, or hand pressure is relaxed on both the left and right hand control bars 28 at the same time, the engine 60 will shut down as both of the series connected safety switches 40 move to the "normally closed contact" condition to complete a shorting circuit across the impulse coil 72.

In an alternate arrangement, only a single safety hand grip assembly 10 may be provided on the handlebar 16 (either left or right) and in this case, a single safety switch 40 is wired in parallel with the push-to-stop switch 80 so that relaxation of hand pressure or withdrawal of the operator's hand from the single hand grip assembly will result in engine shut down.

For the purpose of starting the engine or when it is desired for any reason to disable or lock-out the safety shut down system, the detent elements 34 of one or both hand grip assemblies 10 are moved into the "LOCK-OUT" position (FIG. 1). After the engine has been started, the safety system is easily activated by outward movement of the detent element(s) 34 to the "RELEASE" position with the outer edge of the operator's hand(s). Subsequently, with the safety shut down system activated when the operator's hand pressure on the control bar(s) 28 is relaxed sufficiently or if the operator's hand(s) are removed from the vicinity of the handle grips, the engine 60 will shut down when the safety switch(es) contacts return to their normally closed condition.

In accordance with the present invention, and more specifically as shown in FIGS. 5–8, the boat 20 is of the general type shown in U.S. Pat. No. 3,989,002 and is adapted to be driven and controlled by a rider in a standing or upright position in a recessed footwell or floor area 86 enclosed by walls 88 of the well formed in a unitary deck 90, preferably formed of molded, fiberglass reinforced polyester resin like the hull 64. The deck is joined with a water tight joint to the hull around the periphery of the boat and the joint is covered by a continuous joint molding 92. At the forward end portion, the deck 90 is formed with an upstanding control housing or pedestal 94 having an enlarged, generally triangular shaped opening 94a formed in a rearwardly facing wall thereof for providing access to the interior of the control housing.

The housing is shaped with an upwardly and rearwardly sloping front wall portion which provides support for a swivel element 96. A tiller 98 is secured on the swivel and is adapted to pivot about an upwardly and forwardly sloping steering axis 100 aligned on a centrally disposed, vertically extending, longitudinal plane through the boat hull. The handle bar 16 is supported on an upper end portion of the tiller 98 for controlling the pivotal position thereof and is mounted on a pair of pillow block brackets 102. Opposite end portions of the handlebar extend outwardly through elongated, slotted openings 94b formed on opposite sidewall portions of the housing 94 to accomodate pivotal movement of the handlebar as indicated by the arrows "F".

Steerage or directional control of the boat 20 is provided by pivoting the motor 60 on the transom 62 as indicated by the arrows "J" extending in opposite directions from a neutral position on a center line of the boat. The pivotal position of the outboard motor is controlled by the handlebar 16 at the control station which is up front and remote from the engine and pivotal movement of the handle bar pivots the lower end of the tiller bar 98. A bracket 118 at the lower end of the tiller bar is connected to a pair of steering cables 120 which extend laterally outwardly from the bracket in opposite directions. The cables are entrained around the outside radius a first pair of rotable sheaves or pulleys 122 which are supported from the boat hull on brackets 124. The steering cables pass around the outside radius of the pulleys 122 and then reverse direction to cross and pass around secondary pulleys or sheaves 126 on the opposite sides of the hull, which pulleys are mounted on similar brackets 128. The steering cables then pass rearwardly from the second set of pulleys 126 beneath outer side portions of the deck 90 in relatively long, side runs 120a until reaching a pair of coaming pulleys 130 mounted on the respective opposite sidewalls 88 of the footwell 86 adjacent the transom 62. The steering control cables extend inwardly from the coaming pulleys and are connected to a motor steering bracket 132 on the outboard motor 60.

Forward and downward movement of the right hand side of the handlebar 16 relative to the pivot axis 100 of the swivel 96 causes the boat to turn toward the right by pivoting the outboard motor 60 in a counterclockwise direction as indicated by the arrows "J" in FIG. 8. Similarly, forward and downward movement of the left hand side of the handlebar 16 causes the motor to pivot in a clockwise direction and turns the boat towards the left.

A fuel tank 134 is preferably mounted on the floor 86 underneath a rearward portion of the forward shroud 94 so as to be out of the way and at the same time provide better "fore and aft" weight balance for the outboard boat 20. Fuel from the tank 134 is supplied to the motor through a detachable, flexible fuel line 136 which is disconnectable from the engine through a disconnect assembly 138 and from the tank by a disconnect fitting 139.

In accordance with the present invention, a single lever type, outboard motor control unit 104 is mounted on the underside of the tiller bar 98 (FIGS. 6 and 7), and includes a control shaft 104a and a control lever 104b with a knob 104c mounted on the outer end thereof. Manual movement of the control lever from the neutral position shown in FIG. 6 in a forward direction as indicated by the arrow "G" is effective to cause the outboard 60 to shift into reverse gear followed by increasing throttle settings as forward movement of the lever is continued after shifting occurs. Pivotal movement of the control lever from the neutral position rearwardly and upwardly as indicated by the arrow "H" in FIG. 6, is effective to shift the outboard motor from neutral into forward gear and further continued rotation of the lever in the direction of the arrow after shifting increases the throttle setting and power of the engine. Suitable single lever type control units 104 are readily available from most manufacturers of outboard motors such as Mercury Marine, Outboard Marine Corp. and Chrysler Marine, as well as other foreign manufacturers of outboard motors.

A flexible throttle control cable 106 is interconnected between the single lever control unit 104 and an engine throttle lever on the outboard motor and a similar flexible shift lever control cable 108 is connected between a shift lever on the outboard engine and the single lever control so that both throttle and shift control is available at the control station up front remote from the rear outboard engine 60.

In accordance with the present invention, the position of the engine throttle and shift levers is also controllable by either or both of the left (L) and right (R) hand grip assemblies 10 which are mounted on the outer end portions of the handle bar 16. Preferably, only one of the hand grips is used for rotational control of a single sleeve 12 on the right hand side of the handle bar 16 (the right hand grip for a right handed operator and the left hand grip for a left handed operator) and the opposite hand grip is then fixedly mounted directly on the handle bar 16 rather than a sleeve and is fixed against rotation to provide a firm handle for holding on and positive steering control during a rough side.

The sleeve 12 is connected at its inner end to the control shaft 104a of the single lever control 104 by an endless chain and sprocket drive assembly 110 so that when the hand grip body 26 on the right side is rotated (FIG. 6, arrow A) in a counter clockwise direction from a neutral position, the control lever 104b is rotated in a similar direction (arrow H) and the engine 60 is shifted into forward gear and the throttle setting advanced as rotation is continued. Rotation of the hand grip in an opposite direction (arrow G) results in a shift into reverse gear and subsequent increasing throttle setting as rotation continues.

The unique control apparatus of the present invention thus provides positive, precise and safe control for motor driven vehicles and permits steering control, gear shift control, throttle control and a semi-passive type of safety shut down control of the engine with only one hand. A resettable lockout system for the safety shut down is also provided.

Although the present invention has been described with reference to a single illustrated embodiment thereof, it should be understood that numerous other modifications and embodiments can be made by those skilled in the art that will fall within the spirit and scope of the principles of this invention.

What is claimed as new and is desired to be secured by Letters Patent is:

1. Safety apparatus for power driven vehicles having a handlebar control, comprising:
   a hand grip mounted on said handlebar having an outer gripping surface with a portion thereof forming a safety control surface;
   safety switch means inside said outer gripping surface of said hand grip for shutting down the power unit of said vehicle in response to withdrawal of or reducing the pressure of an operator's hand on said safety control surface portion of said hand grip, said safety switch means including a safety switch and control means defining said safety control surface portion of said hand grip for controlling the position of said safety switch;

means normally biasing said safety switch toward a first position for shutting down said power unit, said safety switch movable toward a second position for enabling operation of said power unit in response to the presence or pressure of said operator's hand on said safety control surface portion; and lockout means on said hand grip selectively movable into a lockout position for retaining said safety switch in said second position even though said operator's hand is withdrawn from or hand pressure is reduced on said safety control surface portion of said hand grip, and biased toward a release position and responsive to movement of said control means of switch means between said first and second positions.

2. Safety apparatus in accordance with claim 1, including:

a pair of said hand grips on said handlebar means and wherein said safety switch means includes circuit means and a safety switch for each of said hand grips for shutting down the operation of said power unit in response to withdrawal of or reducing the pressure of an operator's hand on said safety control surface portions of both of said hand grips.

3. Safety apparatus in accordance with claim 1, wherein:

said control means is engageable with said lockout means for retaining said safety switch in said second position and wherein said lockout means is manually releasable from said control means for permitting movement of said safety switch to said first position when an operator's hand is withdrawn from or hand pressure is reduced on said safety control surface portion of said one hand grip.

4. Safety apparatus in accordance with claim 3, wherein:

said lockout means includes an arm adjacent said safety control surface portion of said hand grip adapted to be moved in one direction toward said release position by an operator's hand while present on said hand grip.

5. Safety apparatus in accordance with claim 4, wherein:

said arm of said lockout means projects outwardly of said safety control surface portion of said hand grip and is adapted to be moved in an opposite direction toward said lockout position engaging said control means to retain said safety switch in said second position.

6. Safety apparatus in accordance with claim 1 including:

spring means urging said lockout means toward said release position.

7. Safety apparatus of claim 6, including:

releasable detent means for normally maintaining engagement between said control means and said lockout means until at least one of said engaged means is manually activated permitting said lockout means to be released.

8. Control apparatus for a motor driven vehicle comprising:

a handlebar mounted to pivot about an axis and adapted to be interconnected through connector means for controlling the propulsion of said vehicle in response to the position of said handlebar;

a hand grip on said handlebar having a an outer gripping surface facilitating manipulation of said handlebar to control said vehicle, said outer gripping surface having a portion thereof forming a safety control surface;

safety switch means inside said outer gripping surface of said hand grip for shutting down a power unit of said vehicle in response to the withdrawal of or reducing the pressure of an operator's hand on said safety control surface portion of said hand grip, said safety switch means including a safety switch and control means defining said safety control surface portion of said hand grip for selecting the position of said safety switch;

means normally biasing said safety switch toward a first position for shutting down said power unit, said safety switch movable toward a second position enabling operation of said power unit in response to the presence or pressure of said operator's hand on said safety control surface portion of said hand grip; and lockout means on said hand grip selectivley movable into a lockout position for retaining said safety switch in said second position even though said operator's hand is withdrawn from said safety control surface portion of said hand grip or hand pressure is reduced thereon, and biased toward a released position and responsive to movement of said control means of said switch means between said first and second positions.

9. Control apparatus in accordance with claim 8, wherein:

said control means is engageable with said lockout means for retaining said safety switch in said second position and wherein said lockout means is manually releasable from said control means for permitting movement of said safety switch to said first position when an operator's hand is withdrawn from or hand pressure is reduced on said safety control surface portion of said one hand grip.

10. Control apparatus in accordance with claim 9, wherein:

said lockout means includes an arm adjacent said safety control surface portion of said hand grip adapted to be moved in one direction toward said release position by an operator's hand while present on said hand grip.

11. Control apparatus in accordance with claim 10, wherein:

said arm of said lockout means projects outwardly of said safety control surface portion of said hand grip and is adapted to be moved in an opposite direction toward said lockout position engaging said control means to retain said safety switch in said second position.

12. Control apparatus in accordance with claim 8 including:

spring means urging said lockout means toward said release position.

13. Control apparatus of claim 12, including:

releasable detent means for normally maintaining engagement between said control means and said lockout means until one of said engaged means is normally activated permitting said lockout means to be released.

14. Control apparatus of claim 8, including:
a pair of said hand grips on said handlebar; and wherein
said safety switch means includes circuit means and a safety switch for each of said hand grips for shutting down said power unit of said vehicle in response to withdrawal of an operator's hand from or reducing hand pressure on said safety control surface portions of both of said hand grips.

15. Apparatus in accordance with claim 1 or 8, wherein:
said hand grip is supported for manually controlled rotation on said handlebar; and control means adapted for connection with said power unit for controlling said power unit in response to a rotative position of said hand grip on said handlebar.

16. Apparatus in accordance with claim 15 wherein said last mentioned means includes means for controlling a gear shift position of said power unit.

17. Apparatus in accordance with claim 15 wherein said last mentioned means includes means for controlling a throttle shift position of said power unit.

18. Apparatus in accordance with claim 17 wherein said last mentioned means includes means for controlling a gear shift position of said power unit.

19. Apparatus in accordance with claim 18 wherein said last mentioned means is operable to provide an increased power throttle position in response to rotation of said grip in either direction from a neutral position on said handlebar.

20. Apparatus in accordance with claim 19 wherein said last mentioned means is operable to move said gear shift into a forward drive position in response to rotation of said hand grip in one direction from said neutral position and into a reverse drive position in response to rotation of said hand grip in an opposite direction from said neutral position.

21. Control apparatus for a power boat, comprising:
handlebar means mounted to pivot about an axis and adapted to be interconnected through connector means for controlling the propulsion of said boat in response to the position of said handlebar means;
a hand grip on said handlebar means having an outer gripping surface facilitating manipulation of said handlebar means to control said boat, said outer gripping surface having a portion thereof forming a safety control surface;
safety switch means inside said outer gripping surface of said hand grip for shutting down the power unit of said boat in response to the withdrawal of an operator's hand from or reducing hand pressure on said safety control surface portion of said hand grip,
said safety switch means including a safety switch and control means defining said safety control surface portion of said hand grip for selecting the position of said safety switch;
means normally biasing said safety switch toward a first position for shutting down said power unit, said safety switch movable toward a second position enabling the operation of said power unit in response to the presence of said operator's hand or hand pressure on said safety control surface portion of said hand grip; and
lockout means on said hand grip selectively movable into a lockout position for retaining said safety switch in said second position even though said operator's hand is withdrawn from or hand pressure is reduced on said safety control surface portion of said hand grip, and biased toward a release position and responsive to movement of said control means of said switch means between said first and second positions.

22. Control apparatus in accordance with claim 21, wherein:
said control means is engageable with said lockout means for retaining said safety switch in said second position and wherein said lockout means is manually releasable from said control means for permitting movement of said safety switch to said first position when an operator's hand is withdrawn from or hand pressure is reduced on said said safety control surface portion of said one hand grip.

23. Control apparatus in accordance with claim 22, wherein:
said lockout means includes an arm adjacent said safety control surface portion of said hand grip adapted to be moved in one direction toward said release position by an operator's hand while present on said hand grip.

24. Control apparatus in accordance with claim 23, wherein:
said arm of said lockout means projects outwardly of said safety control surface portion of said hand grip and is adapted to be moved in an opposite direction toward said lockout position engaging said control means to retain said safety switch in said second position.

25. Control apparatus in accordance with claim 23 or 24, including:
spring means urging said lockout means toward said release position.

26. A power boat having steering and propulsion means and control apparatus with an operator's station remote from said steering and propulsion means including:
handlebar means mounted to pivot about an axis and adapted to be interconnected through connector means for controlling said steering means for controlling the direction of propulsion of said boat in response to the position of said handlebar means;
a hand grip on said handlebar means having an outer gripping surface facilitating manipulation of said handlebar means to control said boat, said outer gripping surface having a portion thereof forming a safety control surface;
safety switch means inside said outer gripping surface of said hand grip for shutting down said propulsion means in response to the withdrawal of an operator's hand from or reducing hand pressure on said safety control surface portion of said hand grip,
said safety switch means including a safety switch and control means defining said safety control surface portion of said hand grip to control the position of said safety switch;
means normally biasing said safety switch toward said first position for shutting down said propulsion means, said safety switch movable toward a second position enabling operation of said propulsion means in response to the presence of or hand pressure of an operator's hand on said safety control surface portion; and
lockout means on said hand grip selectively movable into a lockout position for retaining said safety switch in said second position even though said operator's hand is withdrawn from or hand pressure is reduced on said safety control surface portion of said hand grip and biased toward a release position and responsive to movement of said control means of said switch means between said first and second positions.

27. The power boat in accordance with claim 26, wherein:

said control means is engageable with said lockout means for retaining said safety switch in said second position and wherein said lockout means is manually releasable from said control means for permitting movement of said safety switch to said first position when an operator's hand is withdrawn from or hand pressure is reduced on said safety control surface portion of said one hand grip.

28. The power boat in accordance with claim 27, wherein:

said lockout means includes an arm adjacent said safety control surface portion of said hand grip adapted to be moved in one direction toward said release position by an operator's hand while present on said hand grip.

29. The power boat in accordance with claim 28, wherein:

said arm of said lockout means projects outwardly of said safety control surface portion of said hand grip and is adapted to be moved in an opposite direction toward said lockout position engaging said control means to retain said safety switch in said second position.

30. The power boat in accordance with claim 28 or 26, including:

spring means urging said lockout means toward said release position.

31. A motor vehicle having steering means and a motor driven propulsion means and control apparatus at an operator's station including:

handlebar means mounted to pivot about an axis and adapted to be interconnected through connector means for controlling said steering means for controlling the direction of movement of said vehicle in response to the position of said handlebar means;

hand grip on said handlebar means having a an outer gripping surface facilitating manipulation of said handlebar means to control said vehicle, said outer gripping surface having a portion thereof forming a safety control surface;

safety switch means inside said outer gripping surface of hand grip for shutting down said propulsion means in response to the withdrawal of an operator's hand from or reducing hand pressure on said safety control surface portion of said hand grip, said safety switch means including a safety switch and control means defining said safety control surface portion of said hand grip for controlling the position of said safety switch;

means normally biasing said safety switch toward a first position for shutting down said propulsion means, said safety switch movable toward a second position for enabling operation of said propulsion means in response to the presence or pressure of said operator's hand on said safety control surface portion of hand grip; and lockout means on said hand grip selectively movable into a lockout position for retaining said safety switch in said second position even though said operator's hand is withdrawn from or hand pressure is reduced on on said safety control surface portion of said hand grip and biased toward a release position and responsive to movment of said control means of said switch means between said first and second positions.

32. The motor vehicle in accordance with claim 31, wherein:

said control means is engageable with said lockout means for retaining said safety switch in said second position and wherein said lockout means is manually releasable from said control means for permitting movement of said safety switch to said first position when an operator's hand is withdrawn from or hand pressure is reduced on said safety control surface portion of said one hand grip.

33. The motor vehicle in accordance with claim 32, wherein:

said lockout means includes an arm adjacent said safety control surface portion of said hand grip adapted to be moved in one direction toward said release position by an operator's hand while present on said hand grip.

34. The motor vehicle in accordance with claim 33, wherein:

said arm of said lockout means projects outwardly of said safety control surface portion of said hand grip and is adapted to be moved in an opposite direction toward said lockout position engaging said operator means to retain said safety switch in said second position.

35. The motor vehicle in accordance with claim 33 or 34, including:

spring means urging said lockout means toward said release position.

* * * * *